US 8,800,857 B1

(12) United States Patent
Butler et al.

(10) Patent No.: US 8,800,857 B1
(45) Date of Patent: Aug. 12, 2014

(54) SYSTEM AND METHOD FOR CREDITING LOYALTY PROGRAM POINTS AND PROVIDING LOYALTY REWARDS BY USE OF AN ELECTRONIC TAG

(75) Inventors: Sheila S. Butler, West Chester, PA (US); Charles E. Schwarz, Jr., Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 1250 days.

(21) Appl. No.: 11/903,813

(22) Filed: Sep. 26, 2007

Related U.S. Application Data

(63) Continuation-in-part of application No. 11/397,544, filed on Apr. 4, 2006, now Pat. No. 7,311,244, which is a continuation of application No. 10/937,655, filed on Sep. 9, 2004, now Pat. No. 7,051,925, which is a continuation of application No. 09/927,462, filed on Aug. 13, 2001, now Pat. No. 6,945,453.

(51) Int. Cl.
*G06F 17/00* (2006.01)
(52) U.S. Cl.
USPC .......................................... 235/375; 235/380
(58) Field of Classification Search
USPC ....................................................... 235/375
See application file for complete search history.

(56) References Cited

U.S. PATENT DOCUMENTS

| | | |
|---|---|---|
| 3,634,669 A | 1/1972 | Soumas et al. |
| 3,946,206 A | 3/1976 | Darjany |
| 4,047,033 A | 9/1977 | Malmberg et al. |
| 4,465,206 A | 8/1984 | Sorel et al. |
| 4,545,838 A | 10/1985 | Minkus et al. |
| 4,582,985 A | 4/1986 | Lofberg |
| 4,614,861 A | 9/1986 | Pavlov et al. |
| 4,634,845 A | 1/1987 | Riley et al. |
| 4,689,478 A | 8/1987 | Hale et al. |
| 4,700,055 A | 10/1987 | Kashkashian, Jr. |
| 4,746,787 A | 5/1988 | Okada et al. |
| 4,750,119 A | 6/1988 | Robertson et al. |
| 4,752,676 A | 6/1988 | Leonard et al. |

(Continued)

FOREIGN PATENT DOCUMENTS

| | | |
|---|---|---|
| CA | 2293321 | 12/1998 |
| EP | 0843292 A2 | 5/1998 |

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner* — Daniel Hess
(74) *Attorney, Agent, or Firm* — Hunton & Williams LLP

(57) ABSTRACT

A system and method for tracking and crediting points and rewards in connection with a loyalty program account via aggregating usage of electronic tags is disclosed. Loyalty program members may be offered different rewards based on their participation in the loyalty program. The tags are embedded in objects which may provide visual distinctions between members at different participation levels. In addition to loyalty program rewards, loyalty program members who reach certain threshold participation levels may also be provided with "soft rewards" such as free valet parking, free car washes, free shopping assistance, private check-out, free package delivery and access to a private lounge.

23 Claims, 5 Drawing Sheets

(56) References Cited

U.S. PATENT DOCUMENTS

| | | | |
|---|---|---|---|
| 4,754,418 A | 6/1988 | Hara | |
| 4,766,293 A | 8/1988 | Boston | |
| 4,766,539 A | 8/1988 | Fox | |
| 4,789,928 A | 12/1988 | Fujisaki | |
| 4,822,985 A | 4/1989 | Boggan et al. | |
| 4,831,242 A | 5/1989 | Englehardt | |
| 4,831,526 A | 5/1989 | Luchs | |
| 4,837,422 A | 6/1989 | Dethloff et al. | |
| 4,868,376 A | 9/1989 | Lessin et al. | |
| 4,870,259 A | 9/1989 | Boggan et al. | |
| 4,882,675 A | 11/1989 | Nichtberger et al. | |
| 4,897,533 A | 1/1990 | Lyszczarz | |
| 4,906,826 A | 3/1990 | Spencer | |
| 4,908,521 A | 3/1990 | Boggan et al. | |
| 4,923,288 A | 5/1990 | Allen et al. | |
| 4,928,001 A | 5/1990 | Masada | |
| 4,941,090 A | 7/1990 | McCarthy | |
| 4,943,707 A | 7/1990 | Boggan | |
| 4,953,085 A | 8/1990 | Atkins | |
| 4,954,985 A | 9/1990 | Yamazaki | |
| 4,961,142 A | 10/1990 | Elliott et al. | |
| 4,968,873 A | 11/1990 | Dethloff et al. | |
| 4,975,840 A | 12/1990 | DeTore et al. | |
| 4,978,401 A | 12/1990 | Bonomi | |
| 4,992,940 A | 2/1991 | Dworkin | |
| 5,025,372 A | 6/1991 | Burton et al. | |
| 5,049,728 A | 9/1991 | Rovin | |
| 5,055,662 A | 10/1991 | Hasegawa | |
| 5,056,019 A | 10/1991 | Schultz et al. | |
| 5,080,748 A | 1/1992 | Bonomi | |
| 5,095,194 A | 3/1992 | Barbanell | |
| 5,117,355 A | 5/1992 | McCarthy | |
| 5,146,068 A | 9/1992 | Ugawa et al. | |
| 5,175,416 A | 12/1992 | Mansvelt | |
| 5,180,901 A | 1/1993 | Hiramatsu | |
| 5,192,947 A | 3/1993 | Neustein | |
| 5,202,286 A | 4/1993 | Nakatani | |
| 5,202,826 A | 4/1993 | McCarthy | |
| 5,206,488 A | 4/1993 | Teicher | |
| 5,206,803 A | 4/1993 | Vitagliano | |
| 5,214,700 A | 5/1993 | Pinkas et al. | |
| 5,218,631 A | 6/1993 | Katz | |
| 5,247,190 A | 9/1993 | Friend et al. | |
| 5,276,311 A | 1/1994 | Hennige | |
| 5,287,268 A | 2/1994 | McCarthy | |
| 5,287,269 A | 2/1994 | Dorrough et al. | |
| 5,297,026 A | 3/1994 | Hoffman | |
| 5,311,594 A | 5/1994 | Penzias | |
| 5,326,959 A | 7/1994 | Perazza | |
| 5,326,960 A | 7/1994 | Tannenbaum | |
| 5,328,809 A | 7/1994 | Holmes et al. | |
| 5,339,239 A | 8/1994 | Manabe et al. | |
| 5,349,633 A | 9/1994 | Katz | |
| 5,350,906 A | 9/1994 | Brody et al. | |
| 5,359,183 A | 10/1994 | Skodlar | |
| 5,361,062 A | 11/1994 | Weiss et al. | |
| 5,365,575 A | 11/1994 | Katz | |
| 5,383,113 A | 1/1995 | Knight | |
| 5,397,881 A | 3/1995 | Mannik | |
| 5,399,502 A | 3/1995 | Friend et al. | |
| 5,401,827 A | 3/1995 | Holmes et al. | |
| RE34,915 E | 4/1995 | Nichtberger et al. | |
| 5,424,524 A | 6/1995 | Ruppert et al. | |
| 5,450,477 A | 9/1995 | Amarant et al. | |
| 5,453,601 A | 9/1995 | Rosen | |
| 5,455,407 A | 10/1995 | Rosen | |
| 5,457,305 A | 10/1995 | Akel et al. | |
| 5,459,306 A | 10/1995 | Stein et al. | |
| 5,465,206 A | 11/1995 | Hilt et al. | |
| 5,466,919 A | 11/1995 | Hovakimian | |
| 5,471,669 A | 11/1995 | Lidman | |
| 5,477,038 A | 12/1995 | Levine et al. | |
| 5,477,040 A | 12/1995 | Lalonde | |
| 5,479,494 A | 12/1995 | Clitherow | |
| 5,482,139 A | 1/1996 | Rivalto | |
| 5,483,444 A | 1/1996 | Malark et al. | |
| 5,483,445 A | 1/1996 | Pickering | |
| 5,500,514 A | 3/1996 | Veeneman et al. | |
| 5,511,114 A | 4/1996 | Stimson et al. | |
| 5,512,654 A | 4/1996 | Holmes et al. | |
| 5,513,102 A | 4/1996 | Auriemma | |
| 5,521,363 A | 5/1996 | Tannenbaum | |
| 5,530,232 A | 6/1996 | Taylor | |
| 5,530,235 A | 6/1996 | Stefik et al. | |
| 5,537,314 A | 7/1996 | Kanter | |
| 5,544,086 A | 8/1996 | Davis et al. | |
| 5,544,246 A | 8/1996 | Mandelbaum et al. | |
| 5,553,120 A | 9/1996 | Katz | |
| 5,577,109 A | 11/1996 | Stimson et al. | |
| 5,578,808 A | 11/1996 | Taylor | |
| 5,581,064 A | 12/1996 | Riley et al. | |
| 5,585,787 A | 12/1996 | Wallerstein | |
| 5,590,038 A | 12/1996 | Pitroda | |
| 5,592,560 A | 1/1997 | Deaton et al. | |
| 5,604,542 A | 2/1997 | Dedrick | |
| 5,608,785 A | 3/1997 | Kasday | |
| 5,612,868 A | 3/1997 | Off | |
| 5,621,640 A | 4/1997 | Burke | |
| 5,621,787 A | 4/1997 | McKoy et al. | |
| 5,621,812 A | 4/1997 | Deaton et al. | |
| 5,637,845 A | 6/1997 | Kolls | |
| 5,638,457 A | 6/1997 | Deaton et al. | |
| 5,642,279 A | 6/1997 | Stone et al. | |
| 5,642,485 A | 6/1997 | Deaton et al. | |
| 5,644,723 A | 7/1997 | Deaton et al. | |
| 5,644,727 A | 7/1997 | Atkins | |
| 5,649,114 A | 7/1997 | Deaton et al. | |
| 5,649,117 A | 7/1997 | Landry | |
| 5,649,118 A | 7/1997 | Carlisle et al. | |
| 5,653,914 A | 8/1997 | Holmes et al. | |
| 5,659,741 A | 8/1997 | Eberhardt | |
| 5,664,110 A | 9/1997 | Green et al. | |
| 5,664,157 A | 9/1997 | Takahira et al. | |
| 5,665,953 A | 9/1997 | Mazzamuto | |
| 5,672,678 A | 9/1997 | Holmes et al. | |
| 5,675,607 A | 10/1997 | Alesio et al. | |
| 5,675,662 A | 10/1997 | Deaton et al. | |
| 5,677,955 A | 10/1997 | Doggett et al. | |
| 5,684,291 A | 11/1997 | Taskett | |
| 5,687,322 A | 11/1997 | Deaton et al. | |
| 5,689,100 A | 11/1997 | Carrithers et al. | |
| 5,689,650 A | 11/1997 | McClelland et al. | |
| 5,692,132 A | 11/1997 | Hogan | |
| 5,696,907 A | 12/1997 | Tom | |
| 5,699,528 A | 12/1997 | Hogan | |
| 5,703,344 A | 12/1997 | Bezy et al. | |
| 5,704,046 A | 12/1997 | Hogan | |
| 5,705,798 A | 1/1998 | Tarbox | |
| 5,708,422 A | 1/1998 | Blonder et al. | |
| 5,710,458 A | 1/1998 | Iwasaki | |
| 5,710,886 A | 1/1998 | Christensen et al. | |
| 5,710,887 A | 1/1998 | Chelliah | |
| 5,710,889 A | 1/1998 | Clark et al. | |
| 5,715,399 A | 2/1998 | Bezos | |
| 5,717,925 A | 2/1998 | Harper et al. | |
| 5,721,768 A | 2/1998 | Stimson et al. | |
| 5,721,781 A | 2/1998 | Deo et al. | |
| 5,726,884 A | 3/1998 | Sturgeon et al. | |
| 5,727,153 A | 3/1998 | Powell | |
| 5,728,998 A | 3/1998 | Novis et al. | |
| 5,729,693 A | 3/1998 | Holda-Fleck | |
| 5,734,154 A | 3/1998 | Jachimowicz et al. | |
| 5,734,838 A | 3/1998 | Robinson | |
| 5,736,728 A | 4/1998 | Matsubara | |
| 5,737,421 A | 4/1998 | Audebert | |
| 5,740,549 A | 4/1998 | Reilly et al. | |
| 5,742,775 A | 4/1998 | King | |
| 5,745,049 A | 4/1998 | Akiyama et al. | |
| 5,745,706 A | 4/1998 | Wolfberg et al. | |
| 5,749,075 A | 5/1998 | Toader et al. | |
| 5,760,381 A | 6/1998 | Stich et al. | |
| 5,765,138 A | 6/1998 | Aycock et al. | |
| 5,765,141 A | 6/1998 | Spector | |
| 5,770,843 A | 6/1998 | Rose et al. | |

(56) References Cited

U.S. PATENT DOCUMENTS

| | | | |
|---|---|---|---|
| 5,770,849 A | 6/1998 | Novis et al. | |
| 5,774,870 A | 6/1998 | Storey | |
| 5,777,305 A | 7/1998 | Smith et al. | |
| 5,777,306 A | 7/1998 | Masuda | |
| 5,777,903 A | 7/1998 | Piosenka et al. | |
| 5,778,067 A | 7/1998 | Jones et al. | |
| 5,787,156 A | 7/1998 | Katz | |
| 5,787,404 A | 7/1998 | Fernandez-Holmann | |
| 5,789,733 A | 8/1998 | Jachimowicz et al. | |
| 5,794,207 A | 8/1998 | Walker | |
| 5,799,087 A | 8/1998 | Rosen | |
| 5,802,176 A | 9/1998 | Audebert | |
| 5,805,719 A | 9/1998 | Pare et al. | |
| 5,806,042 A | 9/1998 | Kelly et al. | |
| 5,806,044 A | 9/1998 | Powell | |
| 5,806,045 A | 9/1998 | Biorge | |
| 5,807,627 A | 9/1998 | Friend et al. | |
| 5,809,478 A | 9/1998 | Greco | |
| 5,815,657 A | 9/1998 | Williams et al. | |
| 5,815,658 A | 9/1998 | Kuriyama | |
| 5,819,234 A | 10/1998 | Slavin et al. | |
| 5,819,237 A | 10/1998 | Garman | |
| 5,826,243 A | 10/1998 | Musmanno et al. | |
| 5,832,457 A | 11/1998 | O'Brien | |
| 5,832,488 A | 11/1998 | Eberhardt | |
| 5,835,061 A | 11/1998 | Stewart | |
| 5,835,576 A | 11/1998 | Katz | |
| 5,839,113 A | 11/1998 | Federau et al. | |
| 5,845,259 A | 12/1998 | West et al. | |
| 5,845,260 A | 12/1998 | Nakano et al. | |
| 5,852,811 A | 12/1998 | Atkins | |
| 5,852,812 A | 12/1998 | Reeder | |
| 5,857,079 A | 1/1999 | Claus et al. | |
| 5,857,175 A | 1/1999 | Day | |
| 5,857,709 A | 1/1999 | Chock | |
| 5,859,419 A | 1/1999 | Wynn | |
| 5,864,609 A | 1/1999 | Cross et al. | |
| 5,864,828 A | 1/1999 | Atkins | |
| 5,864,830 A | 1/1999 | Armetta et al. | |
| RE36,116 E | 2/1999 | McCarthy | |
| 5,870,718 A | 2/1999 | Spector | |
| 5,870,721 A | 2/1999 | Norris | |
| 5,875,437 A | 2/1999 | Atkins | |
| 5,883,377 A | 3/1999 | Chapin, Jr. | |
| 5,883,810 A | 3/1999 | Franklin et al. | |
| 5,884,271 A | 3/1999 | Pitroda | |
| 5,884,278 A | 3/1999 | Powell | |
| 5,884,285 A | 3/1999 | Atkins | |
| 5,887,065 A | 3/1999 | Audebert | |
| 5,890,138 A | 3/1999 | Godin et al. | |
| 5,890,140 A | 3/1999 | Clark et al. | |
| H1794 H | 4/1999 | Claus | |
| 5,897,620 A | 4/1999 | Walker et al. | |
| 5,905,246 A | 5/1999 | Fajkowski | |
| 5,907,350 A | 5/1999 | Nemirofsky | |
| 5,911,135 A | 6/1999 | Atkins | |
| 5,911,136 A | 6/1999 | Atkins | |
| 5,914,472 A | 6/1999 | Foladare et al. | |
| 5,920,629 A | 7/1999 | Rosen | |
| 5,920,844 A | 7/1999 | Hotta et al. | |
| 5,920,847 A | 7/1999 | Kolling et al. | |
| 5,923,734 A | 7/1999 | Taskett | |
| 5,926,800 A | 7/1999 | Baronowski et al. | |
| 5,930,217 A | 7/1999 | Kayanuma | |
| 5,931,764 A | 8/1999 | Freeman et al. | |
| 5,933,817 A | 8/1999 | Hucal | |
| 5,937,068 A | 8/1999 | Audebert | |
| 5,940,811 A | 8/1999 | Norris | |
| 5,952,641 A | 9/1999 | Korshun | |
| 5,953,423 A | 9/1999 | Rosen | |
| 5,953,710 A | 9/1999 | Fleming | |
| 5,955,961 A | 9/1999 | Wallerstein | |
| 5,956,695 A | 9/1999 | Carrithers et al. | |
| 5,963,648 A | 10/1999 | Rosen | |
| 5,970,479 A | 10/1999 | Shepherd | |
| 5,970,480 A | 10/1999 | Kalina | |
| 5,974,399 A | 10/1999 | Giuliani et al. | |
| RE36,365 E | 11/1999 | Levine et al. | |
| 5,984,180 A | 11/1999 | Albrecht | |
| 5,984,191 A | 11/1999 | Chapin, Jr. | |
| 5,987,434 A | 11/1999 | Libman | |
| 5,988,509 A | 11/1999 | Taskett | |
| 5,991,413 A | 11/1999 | Arditti et al. | |
| 5,991,743 A | 11/1999 | Irving et al. | |
| 5,991,748 A | 11/1999 | Taskett | |
| 5,991,750 A | 11/1999 | Watson | |
| 5,999,596 A | 12/1999 | Walker et al. | |
| 6,000,608 A | 12/1999 | Dorf | |
| 6,000,832 A | 12/1999 | Franklin et al. | |
| 6,002,383 A | 12/1999 | Shimada | |
| 6,003,762 A | 12/1999 | Hayashida | |
| 6,004,681 A | 12/1999 | Epstein et al. | |
| 6,006,988 A | 12/1999 | Behrmann et al. | |
| 6,009,415 A | 12/1999 | Shurling et al. | |
| 6,014,636 A | 1/2000 | Reeder | |
| 6,014,638 A | 1/2000 | Burge et al. | |
| 6,014,645 A | 1/2000 | Cunningham | |
| 6,014,749 A | 1/2000 | Gloor et al. | |
| 6,016,482 A | 1/2000 | Molinari et al. | |
| 6,016,954 A | 1/2000 | Abe et al. | |
| 6,018,718 A | 1/2000 | Walker et al. | |
| 6,019,284 A | 2/2000 | Freeman et al. | |
| 6,026,370 A | 2/2000 | Jermyn | |
| 6,029,139 A | 2/2000 | Cunningham et al. | |
| 6,029,890 A | 2/2000 | Austin | |
| 6,032,136 A | 2/2000 | Brake, Jr. et al. | |
| 6,036,099 A | 3/2000 | Leighton | |
| 6,038,292 A | 3/2000 | Thomas | |
| 6,038,552 A | 3/2000 | Fleischl et al. | |
| 6,041,315 A | 3/2000 | Pollin | |
| 6,045,042 A | 4/2000 | Ohno | |
| 6,047,067 A | 4/2000 | Rosen | |
| 6,047,268 A | 4/2000 | Bartoli et al. | |
| 6,049,463 A | 4/2000 | O'Malley et al. | |
| 6,049,773 A | 4/2000 | McCormack et al. | |
| 6,049,782 A | 4/2000 | Gottesman et al. | |
| 6,058,378 A | 5/2000 | Clark et al. | |
| 6,061,660 A | 5/2000 | Eggleston et al. | |
| 6,064,985 A | 5/2000 | Anderson | |
| 6,065,675 A | 5/2000 | Teicher | |
| 6,068,183 A | 5/2000 | Freeman et al. | |
| 6,070,067 A | 5/2000 | Nguyen et al. | |
| 6,070,147 A | 5/2000 | Harms et al. | |
| 6,070,153 A | 5/2000 | Simpson | |
| 6,076,068 A | 6/2000 | DeLapa et al. | |
| 6,076,072 A | 6/2000 | Libman | |
| 6,078,888 A * | 6/2000 | Johnson, Jr. | 705/50 |
| 6,078,891 A | 6/2000 | Riordan et al. | |
| 6,091,817 A | 7/2000 | Bertina et al. | |
| 6,092,056 A | 7/2000 | Tull, Jr. et al. | |
| 6,095,412 A | 8/2000 | Bertina et al. | |
| 6,095,416 A | 8/2000 | Grant et al. | |
| 6,098,053 A | 8/2000 | Slater | |
| 6,105,011 A | 8/2000 | Morrison, Jr. | |
| 6,105,865 A | 8/2000 | Hardesty | |
| 6,109,525 A | 8/2000 | Blomqvist et al. | |
| 6,112,191 A | 8/2000 | Burke | |
| 6,115,458 A | 9/2000 | Taskett | |
| 6,116,954 A | 9/2000 | Ries | |
| 6,119,097 A | 9/2000 | Ibarra | |
| 6,119,932 A | 9/2000 | Maloney et al. | |
| 6,122,623 A | 9/2000 | Garman | |
| 6,128,598 A | 10/2000 | Walker et al. | |
| 6,128,599 A | 10/2000 | Walker et al. | |
| 6,129,274 A | 10/2000 | Suzuki | |
| 6,134,536 A | 10/2000 | Shepherd | |
| 6,138,917 A | 10/2000 | Chapin, Jr. | |
| 6,145,741 A | 11/2000 | Wisdom et al. | |
| 6,148,297 A | 11/2000 | Swor et al. | |
| 6,161,096 A | 12/2000 | Bell | |
| 6,163,770 A | 12/2000 | Gamble et al. | |
| 6,164,533 A | 12/2000 | Barton | |
| 6,167,385 A | 12/2000 | Hartley-Urquhart | |
| 6,169,975 B1 | 1/2001 | White et al. | |

(56) References Cited

U.S. PATENT DOCUMENTS

| | | | |
|---|---|---|---|
| 6,173,267 B1 | 1/2001 | Cairns | |
| 6,182,048 B1 | 1/2001 | Osborn et al. | |
| 6,182,894 B1 | 2/2001 | Hackett et al. | |
| 6,186,793 B1 | 2/2001 | Brubaker | |
| 6,189,787 B1 | 2/2001 | Dorf | |
| 6,192,113 B1 | 2/2001 | Lorsch | |
| 6,195,644 B1 | 2/2001 | Bowie | |
| 6,202,053 B1 | 3/2001 | Christiansen et al. | |
| RE37,122 E | 4/2001 | Levine et al. | |
| 6,223,143 B1 | 4/2001 | Weinstock et al. | |
| 6,227,447 B1 | 5/2001 | Campisano | |
| 6,243,688 B1 | 6/2001 | Kalina | |
| 6,263,316 B1 | 7/2001 | Khan et al. | |
| 6,265,977 B1 | 7/2001 | Vega et al. | |
| 6,278,981 B1 | 8/2001 | Dembo et al. | |
| 6,295,522 B1 | 9/2001 | Boesch | |
| 6,298,336 B1 | 10/2001 | Davis et al. | |
| 6,308,268 B1 | 10/2001 | Audebert | |
| 6,336,099 B1 | 1/2002 | Barnett et al. | |
| 6,338,048 B1 | 1/2002 | Mori | |
| 6,341,724 B2 | 1/2002 | Campisano | |
| 6,343,743 B1 | 2/2002 | Lamla | |
| 6,345,261 B1 | 2/2002 | Feidelson | |
| 6,345,766 B1 | 2/2002 | Taskett et al. | |
| 6,349,291 B1 | 2/2002 | Varma | |
| 6,360,954 B1 | 3/2002 | Barnardo | |
| 6,366,220 B1 | 4/2002 | Elliott | |
| 6,373,969 B1 | 4/2002 | Adler | |
| 6,377,669 B1 | 4/2002 | Walker et al. | |
| 6,385,591 B1 | 5/2002 | Mankoff | |
| 6,386,444 B1 | 5/2002 | Sullivan | |
| 6,397,202 B1 | 5/2002 | Higgins et al. | |
| 6,402,039 B1 | 6/2002 | Freeman et al. | |
| 6,405,182 B1 | 6/2002 | Cuervo | |
| 6,415,261 B1 * | 7/2002 | Cybul et al. | 705/14.23 |
| 6,422,459 B1 | 7/2002 | Kawan | |
| 6,422,462 B1 | 7/2002 | Cohen | |
| 6,424,029 B1 | 7/2002 | Giesler | |
| 6,429,927 B1 | 8/2002 | Borza | |
| 6,434,259 B1 | 8/2002 | Hamid et al. | |
| 6,446,210 B1 | 9/2002 | Borza | |
| 6,450,407 B1 | 9/2002 | Freeman et al. | |
| 6,463,039 B1 | 10/2002 | Ricci et al. | |
| 6,467,684 B2 | 10/2002 | Fite et al. | |
| 6,473,500 B1 | 10/2002 | Risafi et al. | |
| 6,484,144 B2 | 11/2002 | Martin et al. | |
| 6,484,148 B1 | 11/2002 | Boyd | |
| 6,498,861 B1 | 12/2002 | Hamid et al. | |
| 6,505,168 B1 | 1/2003 | Rothman et al. | |
| 6,505,780 B1 | 1/2003 | Yassin et al. | |
| 6,529,880 B1 | 3/2003 | McKeen et al. | |
| 6,557,750 B1 | 5/2003 | Druse et al. | |
| 6,560,578 B2 | 5/2003 | Eldering | |
| 6,574,603 B1 | 6/2003 | Dickson et al. | |
| 6,581,839 B1 | 6/2003 | Lasch et al. | |
| 6,601,040 B1 | 7/2003 | Kolls | |
| 6,601,761 B1 | 8/2003 | Katis | |
| 6,609,111 B1 | 8/2003 | Bell | |
| 6,687,222 B1 | 8/2003 | Mittal et al. | |
| RE38,255 E | 9/2003 | Levine et al. | |
| 6,615,189 B1 | 9/2003 | Phillips et al. | |
| 6,615,190 B1 | 9/2003 | Slater | |
| 6,615,194 B1 * | 9/2003 | Deutsch et al. | 705/75 |
| 6,625,582 B2 | 9/2003 | Richman et al. | |
| 6,631,849 B2 | 10/2003 | Blossom | |
| 6,641,049 B2 | 11/2003 | Luu | |
| 6,641,050 B2 | 11/2003 | Kelley et al. | |
| 6,675,127 B2 | 1/2004 | LaBlanc et al. | |
| 6,693,544 B1 | 2/2004 | Hebbecker | |
| 6,742,704 B2 | 6/2004 | Fitzmaurice et al. | |
| 6,745,938 B2 | 6/2004 | Sullivan | |
| 6,757,710 B2 | 6/2004 | Reed | |
| 6,802,008 B1 | 10/2004 | Ikefuji et al. | |
| 6,805,287 B2 | 10/2004 | Bishop | |
| 6,865,547 B1 | 3/2005 | Brake, Jr. et al. | |
| 6,868,426 B1 | 3/2005 | Mankoff | |
| 6,876,971 B1 | 4/2005 | Burke | |
| 6,895,386 B1 | 5/2005 | Bachman et al. | |
| 6,901,372 B1 | 5/2005 | Helzerman | |
| 6,912,502 B1 | 6/2005 | Buddle et al. | |
| 6,945,453 B1 | 9/2005 | Schwarz Jr. | |
| 6,970,830 B1 | 11/2005 | Samra et al. | |
| 6,999,943 B1 | 2/2006 | Johnson et al. | |
| 7,006,992 B1 | 2/2006 | Packwood | |
| 7,051,925 B2 | 5/2006 | Schwarz, Jr. | |
| 7,072,864 B2 | 7/2006 | Brake, Jr. et al. | |
| 7,089,503 B1 | 8/2006 | Bloomquist et al. | |
| 7,104,443 B1 | 9/2006 | Paul et al. | |
| 7,165,049 B2 | 1/2007 | Slater | |
| 7,306,141 B1 | 12/2007 | Schwarz, Jr. | |
| 7,311,244 B1 | 12/2007 | Schwarz, Jr. | |
| 7,349,866 B2 | 3/2008 | Schwarz, Jr. | |
| 7,593,875 B2 | 9/2009 | Granite et al. | |
| 7,774,231 B2 | 8/2010 | Pond et al. | |
| 7,801,799 B1 | 9/2010 | Brake, Jr. et al. | |
| 8,020,754 B2 | 9/2011 | Schwarz, Jr. | |
| 8,033,451 B2 | 10/2011 | Schwarz, Jr. | |
| 2001/0011227 A1 | 8/2001 | Ashery et al. | |
| 2001/0011243 A1 | 8/2001 | Dembo et al. | |
| 2001/0027441 A1 | 10/2001 | Wankmueller | |
| 2001/0034682 A1 | 10/2001 | Knight et al. | |
| 2001/0037315 A1 | 11/2001 | Saliba et al. | |
| 2001/0044293 A1 | 11/2001 | Morgan | |
| 2001/0047342 A1 | 11/2001 | Cuervo | |
| 2001/0054003 A1 | 12/2001 | Chien et al. | |
| 2001/0056398 A1 | 12/2001 | Scheirer | |
| 2002/0019803 A1 | 2/2002 | Muller | |
| 2002/0026418 A1 | 2/2002 | Koppel et al. | |
| 2002/0046255 A1 | 4/2002 | Moore et al. | |
| 2002/0062235 A1 | 5/2002 | Wahlbin et al. | |
| 2002/0073029 A1 * | 6/2002 | Cheaib et al. | 705/41 |
| 2002/0077978 A1 | 6/2002 | O'Leary et al. | |
| 2002/0091572 A1 | 7/2002 | Anderson et al. | |
| 2002/0091631 A1 | 7/2002 | Usui | |
| 2002/0095365 A1 | 7/2002 | Slavin et al. | |
| 2002/0104878 A1 | 8/2002 | Seifert et al. | |
| 2002/0116271 A1 | 8/2002 | Mankoff | |
| 2002/0116330 A1 | 8/2002 | Hed et al. | |
| 2002/0120627 A1 | 8/2002 | Mankoff | |
| 2002/0120642 A1 | 8/2002 | Fetherston | |
| 2002/0143703 A1 | 10/2002 | Razvan et al. | |
| 2002/0147662 A1 | 10/2002 | Anderson | |
| 2002/0165820 A1 | 11/2002 | Anvekar et al. | |
| 2002/0174016 A1 | 11/2002 | Cuervo | |
| 2002/0194081 A1 | 12/2002 | Perkowski | |
| 2003/0004828 A1 | 1/2003 | Epstein | |
| 2003/0023549 A1 | 1/2003 | Armes et al. | |
| 2003/0028518 A1 | 2/2003 | Mankoff | |
| 2003/0033211 A1 | 2/2003 | Haines et al. | |
| 2003/0033246 A1 | 2/2003 | Slater | |
| 2003/0046249 A1 | 3/2003 | Wu | |
| 2003/0053609 A1 | 3/2003 | Risafi et al. | |
| 2003/0064788 A1 | 4/2003 | Walker et al. | |
| 2003/0101119 A1 | 5/2003 | Persons et al. | |
| 2003/0105672 A1 | 6/2003 | Epstein et al. | |
| 2003/0126017 A1 | 7/2003 | Rau et al. | |
| 2003/0135462 A1 | 7/2003 | Brake, Jr. et al. | |
| 2003/0140004 A1 | 7/2003 | O'Leary et al. | |
| 2003/0144935 A1 | 7/2003 | Sobek | |
| 2003/0154125 A1 | 8/2003 | Mittal et al. | |
| 2003/0163403 A1 | 8/2003 | Chen et al. | |
| 2003/0163416 A1 | 8/2003 | Kitajima | |
| 2003/0172040 A1 | 9/2003 | Kemper et al. | |
| 2003/0187787 A1 | 10/2003 | Freund | |
| 2003/0195808 A1 | 10/2003 | Brown et al. | |
| 2003/0200143 A9 | 10/2003 | Walker et al. | |
| 2003/0200180 A1 | 10/2003 | Phelan et al. | |
| 2003/0216965 A1 | 11/2003 | Libman | |
| 2004/0024672 A1 | 2/2004 | Brake, Jr. et al. | |
| 2004/0030626 A1 | 2/2004 | Libman | |
| 2004/0039588 A1 | 2/2004 | Libman | |
| 2004/0059952 A1 | 3/2004 | Newport et al. | |
| 2004/0093296 A1 | 5/2004 | Phelan et al. | |
| 2004/0093303 A1 | 5/2004 | Picciallo | |

(56) References Cited

U.S. PATENT DOCUMENTS

| | | | |
|---|---|---|---|
| 2004/0098351 A1 | 5/2004 | Duke |
| 2004/0210498 A1 | 10/2004 | Freund |
| 2004/0243498 A1 | 12/2004 | Duke |
| 2005/0021400 A1 | 1/2005 | Postrel |
| 2005/0027649 A1 | 2/2005 | Cech |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0091138 A1 | 4/2005 | Awatsu |
| 2005/0171898 A1 | 8/2005 | Bishop et al. |
| 2006/0047589 A1 | 3/2006 | Grau |
| 2006/0178937 A1 | 8/2006 | Rau et al. |
| 2007/0094084 A1 | 4/2007 | Rau et al. |
| 2007/0094154 A1 | 4/2007 | Rau et al. |
| 2007/0228144 A1 | 10/2007 | Knackstedt et al. |
| 2007/0265924 A1 | 11/2007 | Schwarz, Jr. |
| 2008/0010202 A1 | 1/2008 | Schwarz, Jr. |
| 2008/0021841 A1 | 1/2008 | Rau et al. |
| 2009/0043651 A1 | 2/2009 | Schwarz, Jr. |
| 2009/0192906 A1 | 7/2009 | Rau et al. |

FOREIGN PATENT DOCUMENTS

| | | |
|---|---|---|
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 2005/043277 A3 | 5/2005 |

OTHER PUBLICATIONS

Song, A Card That Asks for ID, Time Magazine, Apr. 12, 2004, 1 page.
A Store Card Issuer Looks for Lift from Electronic Gift Certificates, Credit Card News, Feb. 1, 1995, 2 pages.
Claessens, et al., A Tangled World Wide Web of Security Issues, First Monday, retrieved from the internet at http://www.firstmonday.org/issues/issue7_3/claessens, retrieved from the Internet on Oct. 6, 2006.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Award Card Comparison, JA7922.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
Card Based Award Systems, JA8309.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
Definition of Store-Value Card, Wikipedia, retrieved from the internet at http://en.wikipedia.org/wiki/Stored-value_card, retrieved from the Internet on Apr. 16, 2007.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.

(56) References Cited

OTHER PUBLICATIONS

First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Glossman, et al.,, Glossman, et al., Citicorp Company Report, Report No. 1647151, p. 8 of 16.
Machlis, Have it the smart way: Burger King program drives smart-card use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http://cobrands.hoovers.com/global/cobrands/proquest/history.xhtml?COID=10639, Jul. 12, 2005, 2 pages.
How Is It Different?, JA8331.
Konrad, IBM Had a Bunch of Unusual Ideas in 2003, www.philly.com, printed Jan. 21, 2004, posted on Jan. 13, 2004, 2 pages.
Incenticard, Bellsouth, JA8329.
Judy Quinn, Incentive Cards Explained, Incentive, Dec. 1995, 5 pages.
Incentive Firms Find Debit Cards a Rewarding Experience (Off-line debit card issuers converge efforts with companies looking for effective incentives to boost employee productivity and to motivate individuals to buy their products), Debit Card News, Vol.
Vincent Alonzo, Incentive Marketing . . . Three If by Smart Card, Incentive Sep. 1995, p. 11.
Incentive gift Card: Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
LexisNexis Academic, Debit Card Innovation, vol. XXXV, No. 5, p. 2, May 1997.
LexisNexis Academic, Debit Cards: Payroll Card UPS Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, p. 111.
Meridian Award Cards, JA8251.
Meridian—the leader in card marketing, JA8343.
Meridicard vs. Debit Cards, JA7917.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-Call-ATT Campaign Promotes One Number for All Calls, AT&T Marketing, News Release, www.att.com/press/0297/970217.csa.htm, Feb. 17, 1997, 2 pages.
Schwab, Charles, Now 7 Ways for a better Total Return for Your Money; Schwat 1, The Inventor's Asset Management Account, Charles R. Schwab, Charles Schwab & Co., Inc., 16 pages.
Allen et al., Overview of Smart Cards and the Industry, Smart Cards: Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p1(25), ISSN: 1069-7225, 17 pages.
Lazarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment: Overview, p. 10-20.
Stoughton, The Gift of Credit, www.washingtonpost.com/wp-srv/business, Dec. 14, 1998.
Nora Wood, The Power of the Card, Incentive, Jul. 1997, 6 pages.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a Number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/avinews/praaamisc111699.vhtml, Nov. 16, 1999.
Visa first to launch electronic purse load via GSM mobile phone, www.cellular.co.za, Johannesburg, ZA, printed Feb. 23, 2001, 4 pages.

(56) References Cited

OTHER PUBLICATIONS

Visa releases visa cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Welcome to Card Express CardEx, CardEx website archived by web.archive on Oct. 31, 1996, http://web.archive.org/web/*/http://www.cardex.com, retrieve Oct. 18, 2003, 7 pages.

Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.

Swiftgift, Welcome to Swiftgift, www.swiftgiftcard.com, Dec. 8, 1998, 10 pages.

Kenneth Hein, What's the Deal?, Incentive, Jul. 1998, 7 pages.

Machlis et al., Will smart cards replace ATMS?, Computerworld, printed Feb. 23, 2001, 3 pages.

VIVOtech, Inc., "RF-Based Contactess Payment: A More Convenient Way to Pay," VIVOtech, Inc. Version 2.0, pp. 4-25, Apr. 2004.

ViVOtech; "RF-Based contactless payment: a more convenient way to pay;" White Paper—Version 2.0; Apr. 2004.

\* cited by examiner

SYSTEM AND METHOD FOR CREDITING LOYALTY PROGRAM POINTS AND PROVIDING LOYALTY REWARDS BY USE OF AN ELECTRONIC TAG

RELATED APPLICATIONS

This application is a continuation-in-part of U.S. patent application Ser. No. 11/397,544, titled System and Method for Funding a Collective Account By Use of an Electronic Tag, filed on Apr. 4, 2006 now U.S. Pat. No. 7,311,244, which is a continuation application of U.S. patent application Ser. No. 10/937,655, filed on Sep. 9, 2004, now U.S. Pat. No. 7,051,925, which is a continuation of U.S. patent application Ser. No. 09/927,462, filed on Aug. 13, 2001 and now U.S. Pat. No. 6,945,453. The contents of these patents and applications are herein incorporated by reference.

FIELD OF THE INVENTION

The invention relates generally to the crediting of loyalty program points to loyalty program accounts and for providing rewards to loyalty program members through the use of electronic tags ("tag" or "tags").

BACKGROUND OF THE INVENTION

Electronic tags are used today to conduct various financial transactions. For instance, the Mobil® division of ExxonMobil Corporation developed a program called SPEEDPASS® whereby a customer can purchase gas and other goods and services by activating a system with a tag comprising a transponder, where the tag is associated with some source of the customer's funds which are used to pay for the purchase. The tag may be kept on a keyring, and is waved in front of a detector to activate the system.

Credit cards which have embedded electronic tags for purposes of making contactless payments are issued by various card issuers, including the VISA payWave™; MasterCard PayPass® and American Express ExpressPay™. Customers can "wave" their card containing the embedded electronic tag in front of a reader to make a purchase that is charged to that credit card. This approach results in significantly faster transactions than traditional purchase methods using magnetic stripe cards.

Another popular use of electronic tags is in Electronic Toll Collection ("ETC") systems including E-Z PASS,® GEORGIA CRUISE CARD,® SUNPASS,® EPASS,® and FASTRAK,® among others, which allow a motorist to electronically charge a toll for using certain roadways without having to physically stop at a tollbooth to pay the toll. ETC systems are a part of the technology known as Intelligent Transportation Systems ("ITS") fostered by the Intelligent Transportation Society of America ("ITSA"), a society composed of private and public members which was mandated by the United States Congress in the Intermodal Surface Transportation Efficiency Act of 1991 ("ISTEA") to coordinate the development and deployment of intelligent transportation systems in the United States. ETC systems enhance the safety, capacity, and efficiency of the tollway systems in this country, as well as improve customer service and satisfaction.

ETC systems operate when a sensor located at the tollbooth activates and/or detects tag identification information associated with the tag as the motorist passes through the tollbooth. Tag identification information may be contained in bar coded labels, or may be transmitted via an RF or IR or other type of transponder located in the tag, where the emitted signal is read by a reader/antenna located at the tollbooth. When the tag identification information is detected by a scanner or reader/antenna at a tollbooth, a prefunded account associated with that tag is debited the amount of the corresponding toll or charge.

Other uses of electronic tags today include tracking apparel; tracking packaged consumer goods; tracking currency; and tracking patients and personnel.

Many companies and organizations offer their customers and/or members a wide array of discounts, rebates, coupons, awards, prizes, extended warranties, insurance and other purchasing incentives through so-called "loyalty" or "rewards" programs, which terms are used interchangeably in this disclosure. These loyalty programs may range in complexity from a simple punch-card where a repeat customer receives a free item after purchasing some predetermined number of items, to multi-partner syndicated retail loyalty programs. Credits (or points) in loyalty programs can carry a great deal of value to the holder, and may even be donated as charitable items as, for example, donations of frequent flyer program miles to organizations as the Make-A-Wish Foundation™. The main objective of offering these loyalty programs is to increase customer retention and loyalty to the company or organization, while providing the offering company or organization marketing data on their consumer base.

Often, as a further incentive to loyalty program members who have reached a threshold amount of loyalty program credits through their purchases from a goods or service provider, the loyalty program sponsor may provide additional benefits (or "soft rewards") to such a loyalty program member. For example, frequent flyer members may be rewarded with a "quick" line to pass through security and early boarding on an airplane, based on their achievement of a minimum number of miles in the frequent flyer program. Such "soft rewards" do not cost the loyalty program member any "points" or "credits" but allow the loyalty program sponsor to further encourage patronage by the loyalty program member with that sponsor.

SUMMARY OF THE INVENTION

The system and method of the invention relates to crediting points to a loyalty program member's loyalty program account by detecting at a point-of-sale an electronic tag presented by or present on a loyalty program member at the time of a purchase transaction. As used in this specification, the terms "tag" and "electronic tag" refer to any known or later developed device or object that can store and transmit data to a reader in a contactless manner using radio waves. The data ("tag identification information") is emitted or detected from the tag, and can be used to identify the tag as associated with an account such as a loyalty program account. The tag identification information can be used to identify loyalty program account information of the loyalty program account associated with the electronic tag.

The system and method of the invention provides a way for loyalty program sponsors to credit loyalty program credits with the ease of a contactless payment transaction. In one embodiment, a customer of an entity that operates or sponsors a loyalty program can apply or request to open a loyalty program account. An application to open an account can as simple as issuing an account number to the customer. In other embodiments, the application may request customer information such as name, address, birth date and other information that the entity may wish to gather as part of its marketing efforts.

Once the application is approved and a loyalty program account is opened, the customer (who then becomes the loyalty program account owner) is given an object with an embedded electronic tag. The tag identification information that is programmed into the embedded electronic tag is associated with the loyalty program account.

In another embodiment, the customer is already a loyalty program account owner but requests a tag to be associated with the account. The loyalty program account owner is given an object with an embedded electronic tag. The tag identification information that is programmed into the embedded electronic tag is associated with the already-existing loyalty program account.

Subsequently, when the loyalty program account owner presents the electronic tag when making a purchase transaction from the loyalty program sponsor or operator, the tag identification information is detected at the point-of-sale device by a reader/antenna or other detector. This tag identification information is then used to identify the loyalty program account in order to provide credits to the account for those purchases.

Credits can be provided to the loyalty program account regardless of the method required by the loyalty program sponsor for funding the purchase. For example, certain loyalty programs require the use of a specific funding vehicle, e.g., loyalty program credits are credited to the loyalty program account only when a purchase is made using an affinity-branded credit card or a merchant card. The system and method of the invention is suitable for such loyalty programs. The system and method of the invention can also be used for loyalty programs that do not require the use of any specific funding method, i.e., in loyalty programs where the crediting of loyalty points is "tender neutral" and not dependent on the use of any specific funding vehicle.

The electronic tag may be embedded in different objects and typically is detected by a sensor located at a point-of-sale device. For example, the tracking device may be embedded in a piece of jewelry, such as a charm, a necklace, a ring, a bracelet or a watch, that is distributed to loyalty program members. When the loyalty program member who is wearing or carrying the jewelry with the embedded electronic tag presents that jewelry at a point-of-sale device to make a purchase, a sensor (or reader, or detector) can detect the tag identification information emitted from the electronic tag. The tag identification information is used to identify the loyalty program account of a loyalty program member to provide credits to the loyalty program associated with the electronic tag.

The tracking device may be embedded in different objects, which may be distributed to different loyalty program members. For example, the tracking device may alternatively be embedded in an item such as cuff links, a money clip, a watch, a tie clip, a wallet, a pocket knife, a lighter or a pen. The tracking device may be embedded in an object that is distinctive to the loyalty program or loyalty program sponsor, for example by having a distinctive shape or color that is associated with the sponsor of the loyalty program.

Loyalty program members who have reached threshold participation levels can be identified using the tag identification information. Achievement of threshold participation levels can qualify the loyalty program member for additional benefits. For example, a loyalty program member who has reached a certain threshold of participation in a loyalty program may be offered free or reduced rate valet parking or a free or reduced rate car wash when the loyalty program member shops with a loyalty program sponsor. The electronic tag that is embedded in the object belonging to the loyalty program member may be detected when she/he arrives at the location of the loyalty program sponsor at the site of the valet parking or car wash. The loyalty program member's participation level may be determined to see if he/she is entitled to such additional "soft rewards" by using the tag identification information to access information regarding the loyalty program account, and specifically participation levels.

In another embodiment, the loyalty program member may be detected by a sensor that is located at an entrance to a store location or by approaching sensor stations located throughout the store. The store may provide additional benefits such as access to a private lounge or a free shopping assistant to the loyalty program member, depending on her/his participation level in the loyalty program. In one embodiment, staff at the store location may be able to access information that allows the staff member to recognize the loyalty program member and greet her/him personally and offer assistance.

In another embodiment of the invention, the object in which the electronic tag is embedded may differ according to the loyalty program member's participation level. This can provide store employees a "visual" determination of certain loyalty program members, without the need to detect the embedded electronic tag.

The tag may also be associated with a source of funds, pursuant to which a loyalty program member can automatically charge a purchase of goods or services to the associated source of funds. The associated source of funds may itself be a prefunded account, and may also be associated with at least one other source of funds, as an individual account, to replenish the prefunded account balance. In this embodiment, the tag identification information is used to identify the loyalty program account of a loyalty program member to provide credits or points to the loyalty program associated with the electronic tag and also identify the funding source. The system can be configured to then complete the transaction using the associated funding source for payment.

Other features and advantages of the invention will become apparent from the description of the preferred embodiments in conjunction with the following figures.

BRIEF DESCRIPTION OF THE DRAWINGS

The invention will be described with reference to the accompanying drawings, in which like elements are referenced with like numerals.

DETAILED DESCRIPTION OF THE INVENTION

Figure 1:
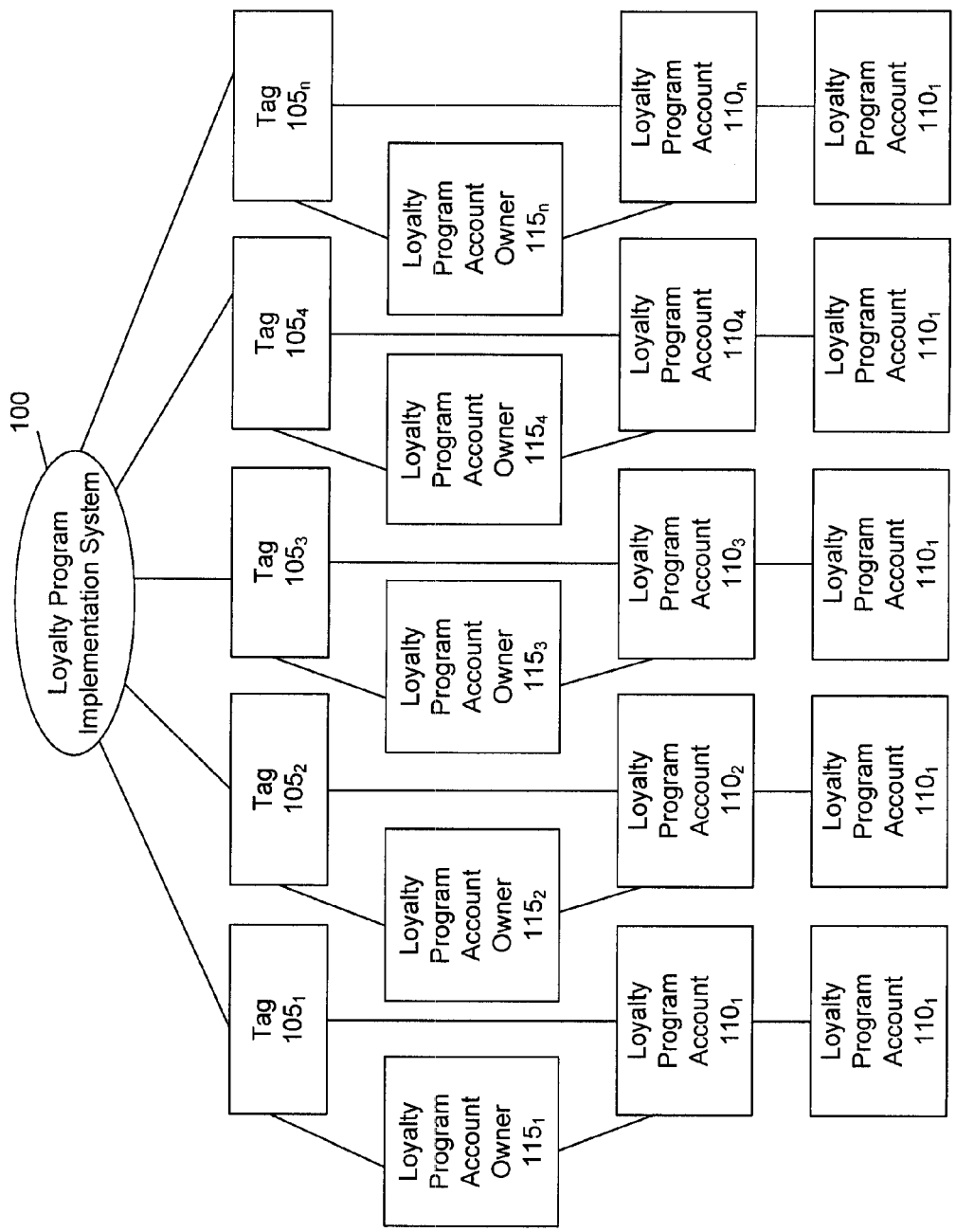
FIG. 1 is a schematic of one embodiment of the invention illustrating a loyalty program implementation system.

The invention relates generally to a method and system for crediting loyalty program points to a loyalty program account through the use of electronic tags. One embodiment of the invention comprises a plurality of loyalty program accounts that are opened at the request of customers, who are issued objects with embedded electronic tags. The electronic tags are programmed with tag identification information, which is associated with the loyalty program accounts. Optionally, the tag identification information is also associated with a source of funds.

In one embodiment, a customer of an entity that operates or sponsors a loyalty program can apply or request to open a loyalty program account. An application to open an account can as simple as issuing an account number to the customer. In other embodiments, the application may request customer information such as name, address, birth date and other information that the entity may wish to gather as part of its marketing efforts.

Once the application is approved and a loyalty program account is opened, the customer (who then becomes the loyalty program account owner) is given an object with an embedded electronic tag. The tag identification information that is programmed into the embedded electronic tag is associated with the loyalty program account.

In another embodiment, the customer is already a loyalty program account owner but requests a tag to be associated with the account. The loyalty program account owner is given an object with an embedded electronic tag. The tag identification information that is programmed into the embedded electronic tag is associated with the already-existing loyalty program account.

The invention further comprises aggregating loyalty program credits in the loyalty program account. The system is typically implemented by or on behalf of the entity that holds the liability for the loyalty program. One or more rewards may be made available to the loyalty program account holder based on the aggregate loyalty program credits. The above steps can be accomplished in real time or on a periodic basis. The loyalty program credits may be used for a wide array of discounts, rebates, coupons, awards, prizes, extended warranties, insurance and other purchasing incentives. Typically, the loyalty program member "exchanges" or "redeems" the aggregated loyalty points for one or more rewards, in which case the balance of loyalty points in the member's loyalty program account is decreased correspondingly.

According to another embodiment of the invention, a loyalty program member may be eligible to receive additional "soft rewards" if he/she amasses a threshold number of loyalty program credits during some period of time. Such "soft rewards" are often provided to more active members of the loyalty program, but typically do not require the redemption of any loyalty points for the reward. For example, frequent flyers who fly a certain number of miles in a year in a frequent flyer loyalty program may be permitted to enter a fast security line, or may be given preferential early boarding on an airplane. Similarly, active members of a loyalty program for goods or services may be offered such privileges as private check-out service, free or reduced rate valet parking, free or reduced rate car wash or free shopping assistance in the form of "soft rewards" for having aggregated a threshold number of loyalty points within a certain period of time.

Another embodiment of the invention relates to a computer-based system for tracking and crediting loyalty points to loyalty program accounts, wherein one or more tags are associated with each loyalty program account. The system may include a host computer configured to provide programmed response and comprising software configured to monitor individual tag usage and loyalty program account balances, and to aggregate tag usage. The host computer may be configured to perform other functions such as generate statements of loyalty program accounts that are provided to loyalty program members, and may also be configured to automatically initiate a funds transfer from a funding account associated with an electronic tag to fund a transaction.

In another embodiment, information on loyalty program accounts may be uploaded from the host computer to computers local to the point-of-sale devices to enhance response time. Information can be uploaded daily, several times daily or any other time period that is determined by the loyalty program system operator or sponsor.

In addition, a plurality of remote computers may be networked or otherwise configured to communicate with the host computer, where the remote computers are associated with reader/antennas at point-of-sale devices or other sites where goods or services related to the loyalty program may be purchased. The reader/antennas may be configured to detect tag identification information and transmit the tag identification information (along with the transaction amount, if applicable) to the remote computers, which can then transmit the information to the host computer to credit loyalty points for the transaction to the loyalty account and to charge the associated funding account associated with the tag, where applicable. Alternatively, remote computers may access the host computer for tag identification information, and identify the funding account associated with the tag before transmission of the transaction amount information to the host computer.

Tags are typically embedded in an object that is easy or even desirable for the loyalty program member to carry. Alternatively or additionally, the tracking device may be embedded in an object that is distinctive to the loyalty program or loyalty program sponsor, for example by having a distinctive shape or color that is associated with the sponsor of the loyalty program. For example, objects such as jewelry or apparel may be distributed to loyalty program members which have the tag embedded therein. Such objects could include, without limitation, rings, necklaces, earrings, bracelets, charms, key rings and watches. Apparel such as a dress, hat, sweater, shoes, sunglasses, purses, scarves, barrettes and shopping bags may also be used for embedding the tag. Any other object in which a tag or other tracking device can be embedded is also suitable, such as a button, a medallion, a tie tack, a dog tag, a pin, a lapel pin, key rings, cuff links, money clips, tie clips, wallets, pens, pocket knives, belts, a belt buckle or lighters.

Further segmentation of loyalty program members according to participation in the loyalty program can be achieved in several manners. For example, loyalty program members may all be eligible to receive a certain object, for example a bracelet with a certain charm for women and a money clip for men, just for being loyalty program members. As participation in the loyalty program increases, at certain thresholds members may receive a different object, for example a different charm for women and a wallet for men. In this manner, loyalty program members can easily be distinguished visually according to their participation in the loyalty program.

Further, certain objects may provide an incentive for members to increase participation. For example, designer objects, such as a designer charm or a designer tie clip, may be provided to loyalty program members who reach a certain threshold participation in the loyalty program.

The loyalty program account holder may also have several different objects with embedded tags that are linked to the loyalty account. These tags may be programmed to emit the same tag identification information, or else the tag identification information of each tag may be linked to the loyalty program account. This could permit increased participation in the loyalty program and thus increased credits in the loyalty program account by crediting more than one person's purchase amounts to the account.

Rewards for participation in the loyalty program can comprise anything of value to the loyalty program member.

Rewards may comprise discounts, rebates, coupons, awards, prizes, extended warranties, insurance, cash, frequent flyer miles and other purchasing incentives. "Soft rewards" may comprise free services, such as valet parking, car washes, shopping assistance, private check-out, free delivery of purchases and access to a private lounge. The tag may in such cases provide access to soft rewards. For example, a private lounge open only for loyalty program members who have reached a certain participation level may require that these members present their tags. The tag identification information can be used to identify the associated loyalty program account, and the participation level can be determined to see if entry to the private lounge is permitted.

In one embodiment, staff at the store location may be able to access information that allows the staff member to recognize the loyalty program member and greet her/him personally. For example, the tag identification information may also be associated with information in a file such as an image of the loyalty program member. When the loyalty program member enters the store and her/his tag is detected, a staff member may receive a notification by email, instant message, text message, a "pop up" on a screen of a communication device such as a cell phone or PDA or any other wireless or wired communication method and/or device that the loyalty program member has entered the store. The image file of the loyalty program member may associate the notification message so that the staff member can identify the loyalty program member and personally greet her/him and offer assistance.

Threshold participation levels may be determined over certain periods of time or for overall participation. Different rewards may be available according to the type of participation level that is achieved. For example, "soft rewards" may be based on lifetime participation or participation within a fixed time period, such as annually or monthly. "Soft rewards" may be different according to the different participation period and thresholds. For example, certain thresholds may be based on dollars spent, and other thresholds may be based on number of visits or purchases made. There may be different levels within each threshold to further segment the loyalty program members.

Security measures may be taken as well in connection with the invention. For example, authentication of the tagholder may be required at the point-of-sale. Authentication measures could comprise use of a secret such as a password or a PIN, or a biometric. Additional authentication measures could comprise certain "gestures": for example, a snap of a finger or a hand signal or facial gesture could provide authentication. Another example of a security measure is a "screen pop" to the POS device of an image of the loyalty program member associated with the tag identification information. The POS device attendant can then make a visual confirmation that the person presenting the object with the embedded tracking device is the owner of the loyalty program account.

Additionally, codes may be provided to loyalty program members so that purchases made when the member is not physically present at a point-of-sale location can be credited to the loyalty program account, such as purchases made at home over the Internet or by phone. Additionally, readers/antennas or other detectors that connect to a personal computer can be provided to members so that the tag can be scanned at a remote location.

Also, tag identification information can be used to determine if loyalty program account owners are entitled to discounts or free goods in the form of redemption of loyalty program account credits while at the point-of-sale location. For example, the loyalty program member may be offered a discount on his/her present purchase in exchange for redemption of loyalty program credits in his/her loyalty program account. The loyalty program member may be offered a selection of discounts depending on how many loyalty program credits he/she desires to redeem. For example, the loyalty program member may be offered one or more items at no cost at the time of purchase for redemption of 10,000 loyalty program credits. Alternatively, the loyalty program member may be offered a 50% discount on the price of those one or more items for redemption of 5,000 loyalty program points. Other discounts and offers may be made as well. For example, the store may offer the loyalty program member an additional item in exchange for redemption of loyalty program credits. Such offers may depend on purchase of a certain base item. For example, if a loyalty program member purchases a wallet from a certain manufacturer, he/she may be offered a key ring from that same manufacturer at no cost but for redemption of loyalty program points. These embodiments are for illustration only and not intended to limit the types of discounts that may be offered loyalty program members.

Although the invention is described in terms of tags associated with loyalty program accounts, this description is not intended to limit the invention but is rather one embodiment as will be apparent to those skilled in the art. One alternative embodiment may include the use of bar codes rather than electronic tags for identifying a loyalty program account.

Referring now to FIG. 1, a schematic of one embodiment of a loyalty program implementation system 100 is detailed for crediting points to a loyalty program account. The loyalty program implementation system 100 could be administered by the entity with the loyalty program liability, by or on behalf of an entity that supervises and/or implements the loyalty program. The loyalty program implementation system 100 comprises a plurality of tags $105_1$ through $105_n$, wherein each tag is associated with tag identification information detectable by a reader/antenna or other sensor and each tag is embedded in an object. Each tag $105_1$ through $105_n$ is associated with at least one loyalty program account $110_1$ through $110_n$. Each loyalty program account $110_1$ through $110_n$ has one or more loyalty program account owners $115_1$ through $115_n$. Also, each loyalty program account $110_1$ through $110_n$ may optionally be associated with a funding source 120. Alternatively or additionally, a loyalty program account $110_n$ may be associated with multiple tags $105_{1-n}$ (not shown).

Figure 2:
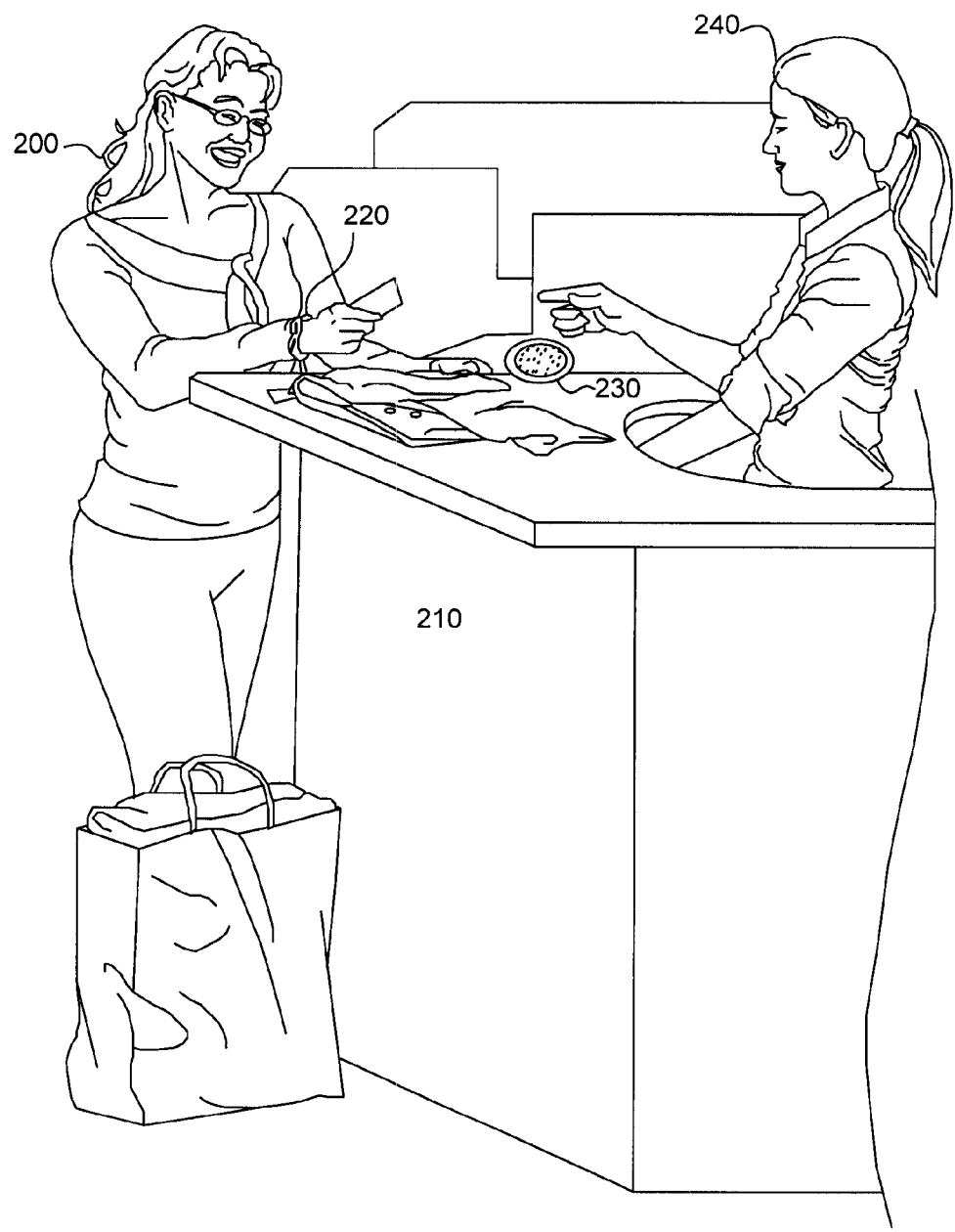
FIG. 2 is a depiction of one embodiment of the invention as used by a loyalty program customer when making a purchase at a store location.

FIG. 2 is a depiction of one embodiment of the invention as used by a loyalty program member when making a purchase at a store location. Loyalty program member 200 presents a purchase transaction at a POS location 210. The loyalty program member 200 is wearing, in this embodiment, a bracelet 220 that has an embedded tracking device (not shown). The tracking device emits tag identification information when presented to a detector 230 at the POS location. An attendant 240 may enact a security measure when the tag identification information is detected. For example, the attendant 240 may ask for identification or a secret, such as a password or PIN. The attendant 240 may offer discounts or may offer "soft rewards" to the loyalty program member 200. The attendant 240 can then complete the transaction and credits will be credited to or debited from the loyalty program account of the loyalty program member 200, depending on whether the loyalty program member 200 redeems any loyalty program points during the transaction.

Figure 3:
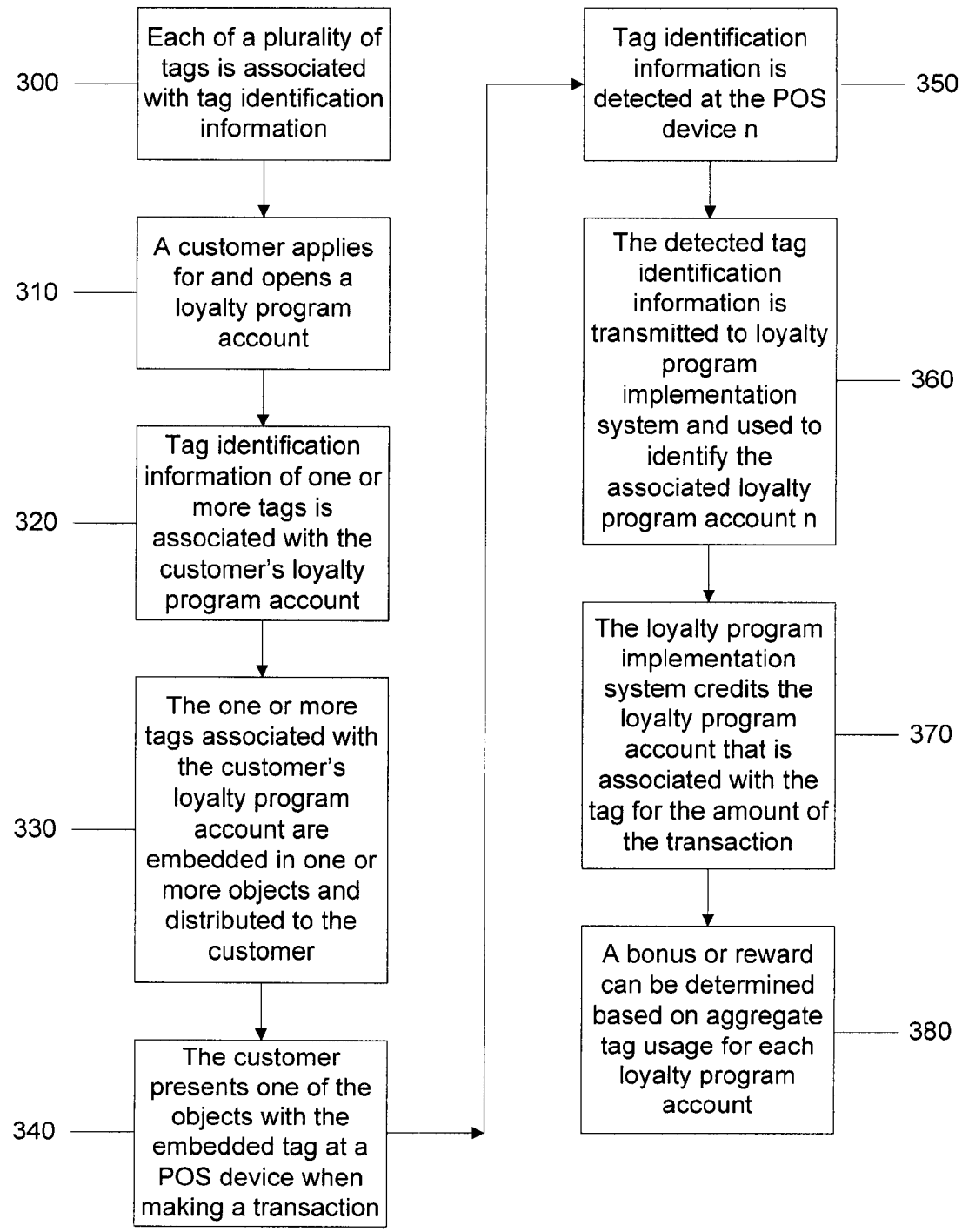
FIG. 3 is a flowscheme of one embodiment of the invention.

A flowscheme of one embodiment of the invention is shown in FIG. 3. At 300, each tag $105_n$ is programmed with tag identification information that can be detected by a reader/antenna or other detector. For example, the reader/antenna may detect signals emitted by a transponder located in the electronic tag, such as RF or IF signals, or alternatively the tag may comprise a bar code which is detectable by a sensor. At 310, a customer applies for and opens a loyalty program account $110_n$. At 320, the tag identification information for one or more tags is associated with the customer's loyalty program account $110_n$ and optionally a funding source 120. At 330, the tags $105_n$ are embedded in objects and distributed to the loyalty program account owner $115_n$ of the associated loyalty program account $110_n$.

The loyalty program account owner $115_n$ presents the object with the embedded tag $105_n$ at a point-of-sale when conducting a transaction, for example purchasing goods or services, at 340. "Presenting" the tag $105_n$ may comprise, for example, waving a bracelet having a charm with the embedded tag $105_n$ close to a reader/antenna or other reader. Other methods of "presentment" can be used, depending on the object in which the tag $105_n$ is embedded. Also, although this description references the loyalty program account owner $115_n$, any person who holds the object with the embedded tag $105_n$ may present the object at the time of making a purchase to obtain credits for the loyalty program account $110_n$.

At 350, tag identification information is detected by a reader/antenna located at the point-of sale. Tag identification information is transmitted to the loyalty program implementation system 100 and used to identify the associated loyalty program account $110_n$ at 360.

The loyalty program implementation system 100 credits the loyalty program account $110_n$ that is associated with the tag $105_n$ for the amount of the transaction at 370. Also, the loyalty program implementation system 100 may track and store information regarding the number of transactions and corresponding dates when the tag $105_n$ was presented along with a purchase transaction by the loyalty program account owner $115_n$. Additionally, the loyalty program implementation system 100 may identify the associated funding source 120 and fund the transaction using the funding source 120 (not shown). At 380, a bonus or reward can be determined based on aggregate tag usage for each loyalty program account $115_n$.

Figure 4:
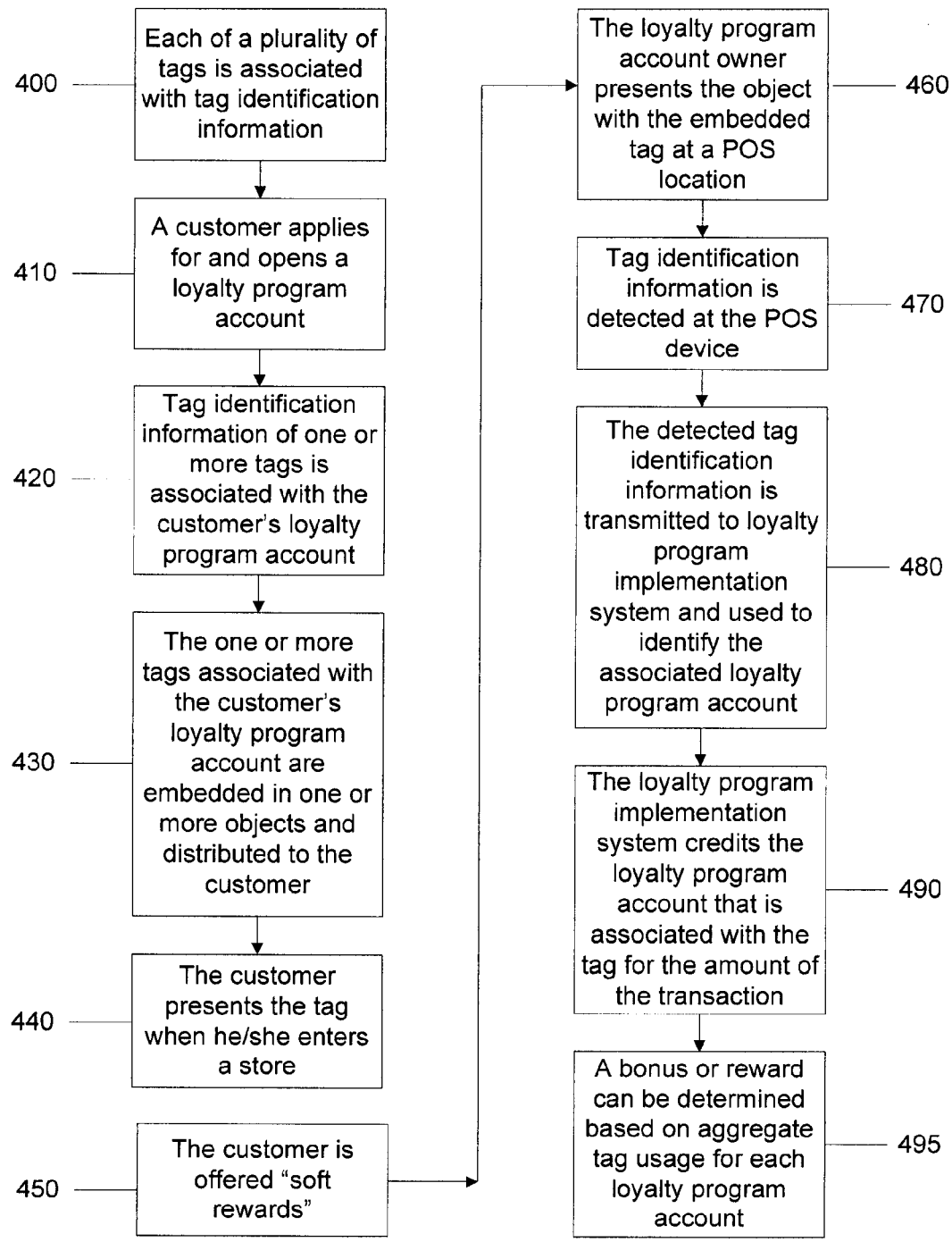
FIG. 4 is a flowscheme of an alternative embodiment of the invention

A flowscheme of an alternative embodiment of the invention is shown in FIG. 4. At 400, each tag $105_n$ is programmed with tag identification information that can be detected by a reader/antenna or other detector. For example, the reader/antenna may detect signals emitted by a transponder located in the electronic tag, such as RF or IF signals, or alternatively the tag may comprise a bar code which is detectable by a sensor. At 410, a customer applies for and opens a loyalty program account $110_n$. At 420, the tag identification information for each tag is associated with a loyalty program account $110_n$ and optionally a funding source 120. At 430, the tag $105_n$ is embedded in an object and distributed to the loyalty program account owner $115_n$ of the associated loyalty program account $110_n$.

At 440, the loyalty program account owner $115_n$ presents the object with the embedded tag or otherwise the tag $105_n$ is detected when the loyalty program account owner $115_n$ enters a store or other site which provides credit for the loyalty program associated with the tag $105_n$. For instance, a reader/antenna or other detector may be situated at entrances to the store that can detect the tag $105_n$. Alternatively, readers/antennas or other detectors may be situated at stations within a store where a loyalty program account owner $115_n$ may "scan" or "present" the object with the embedded tag $105_n$. "Presenting" the tag $105_n$ may comprise, for example, waving a bracelet having a charm with the embedded tag $105_n$ close to a reader/antenna or other reader. Other methods of "presentment" can be used, depending on the object in which the tag $105_n$ is embedded. At 450, the loyalty program account owner (or other person who has physical possession of the object with the embedded tag $105_n$) may be offered "soft rewards" based on participation level in the loyalty program. For example, the loyalty program account owner $115_n$ may be offered free or reduced rate valet parking, a free or reduced rate car wash, a personal shopping assistant, private checkout or entrance and use of a private shopping lounge. The tag $115_n$ may provide entrance to, for example, the private shopping lounge.

The loyalty program account owner $115_n$ presents the object with the embedded tag $105_n$ at a point-of-sale when conducting a transaction, for example purchasing goods or services, at 460. "Presenting" the tag $105_n$ may comprise, for example, waving a bracelet having a charm with the embedded tag $105_n$ close to a reader/antenna or other reader. Other methods of "presentment" can be used, depending on the object in which the tag $105_n$ is embedded. Also, although this description references the loyalty program account owner $115_n$, any person who holds the object with the embedded tag $105_n$ may present the object at the time of making a purchase to obtain credits for the loyalty program account $110_n$.

At 470, tag identification information is detected by a reader/antenna located at the point-of sale. Tag identification information is transmitted to the loyalty program implementation system 100 and used to identify the associated loyalty program account $110_n$ at 480.

The loyalty program implementation system 100 credits the loyalty program account $110_n$ that is associated with the tag $105_n$ for the amount of the transaction at 490. Also, the loyalty program implementation system 100 may track and store information regarding the number of transactions and corresponding dates when the tag $105_n$ was presented along with a purchase transaction by the loyalty program account owner $115_n$. Additionally, the loyalty program implementation system 100 may identify the associated funding source 120 and fund the transaction using the funding source 120 (not shown). At 495, a bonus or reward can be determined based on aggregate tag usage for each loyalty program account $115_n$.

Figure 5:
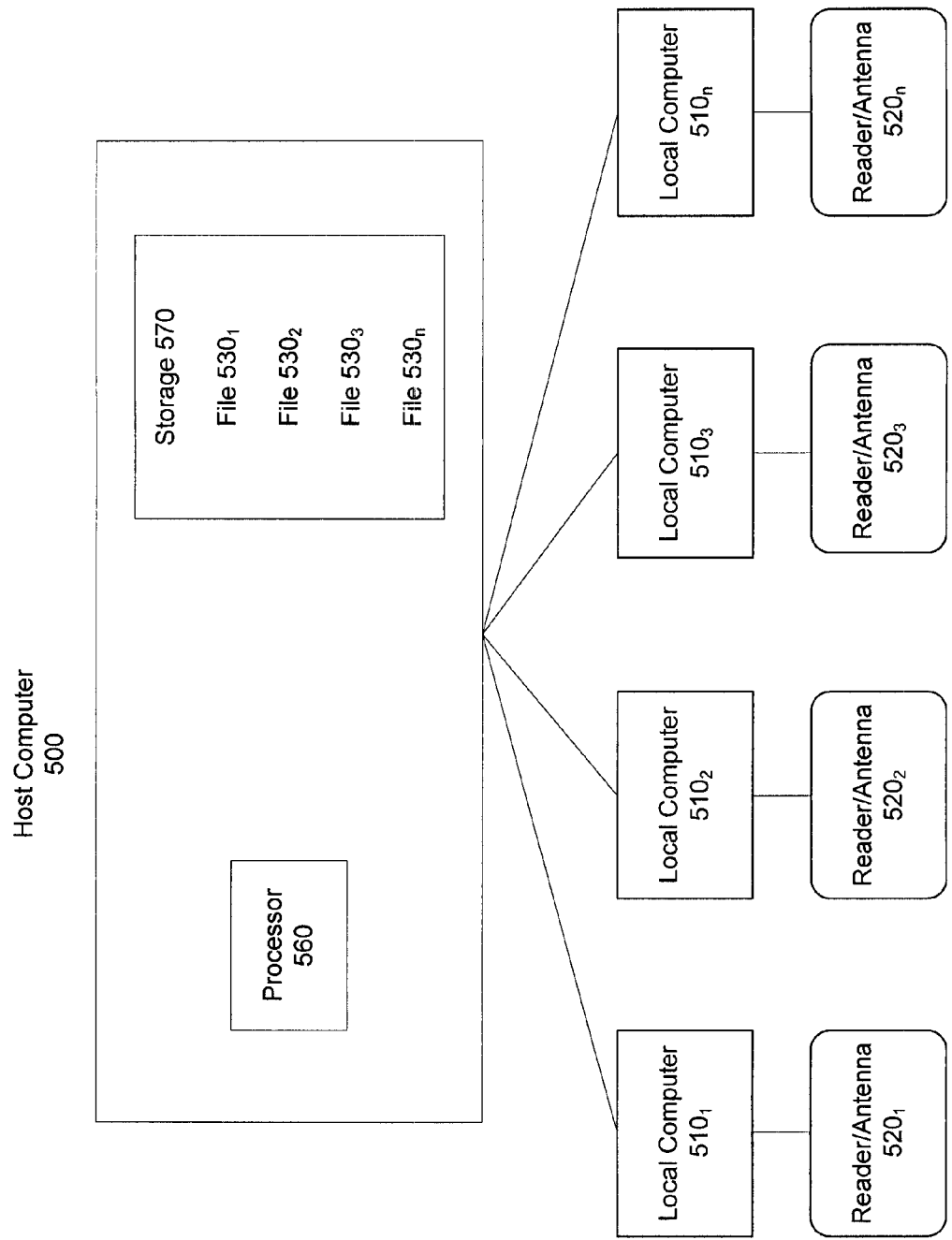
FIG. 5 is a schematic of a computer-based system for a loyalty program implementation system.

Referring to FIG. 5, one embodiment of a computer-based system for crediting a loyalty program account is described. The loyalty program implementation system 100 may have a host computer 500, a plurality of remote computers $510_1$ through $510_n$, and a plurality of reader/antennas $520_1$ through $520_n$ associated with remote computers $510_1$ through $510_n$. Typically, remote computers $510_1$ through $510_n$ are associated with or located in close proximity to a point-of-sale device, such as a cash register. Alternatively, a reader/antenna $520_n$ may be associated with a personal computer located in the home or workplace of a loyalty program account owner $115_n$. The host computer has a processor 560 configured to provide programmed response, and also has a storage unit 570, which may comprise a hard drive or other magnetic, solid state or other storage media, for storing applications, data, operating system and other information.

Upon or anytime after the object with the embedded tag $105_n$ has been distributed to the loyalty program account owner $115_n$, searchable indexed computer files $530_1$ through $530_n$ are created by the host computer processor 560 for each enrolled loyalty program account owner $115_n$ and stored in host computer storage 570. Files $530_1$ through $530_n$ may contain such information as the loyalty program account owner's name, address, tag identification information, optional funding source 120 information, aggregated tag usage, and dates and amounts of transactions for which loyalty program credits have been awarded. The stored loyalty program account information may be acquired from the loyalty program account owner when she/he applies to open the loyalty program account. Each loyalty program account is indexed to associated tag identification information.

A plurality of readers/antenna $520_1$ through $520_n$ may be located at locations remote from the host computer 500 at sites where loyalty program account owner $115_n$ purchase goods or services. As noted, this may include a personal computer of a loyalty program account owner $115_n$. The tag identification information is transmitted or otherwise detected by a reader/antenna $520_n$ and transmitted to remote computer $510_n$ which can in turn transmit tag identification information to host computer 500. In addition, each local computer $510_n$ may also have a processor configured to provide programmable response and storage capability.

When tag identification information is detected by the reader/antenna $520_n$ for a purchase of a good or a service, tag identification information can be recorded in the local computer $510_n$ along with the amount of the transaction. Either in real time or on a periodic basis, the local computer $510_n$ can communicate with the host computer 500 and transmit the detected tag identification information along with the associated transaction amount. Using the tag identification information, the host computer 500 can access the file $530_n$ indexed by that tag identification information, and credit the transaction amount for purposes of awarding loyalty program credits to the associated loyalty program account $110_n$. Optionally, host computer 500 may also identify an associated funding source 120 and fund the transaction using associated funding source 120.

The foregoing embodiments have been presented for the purpose of illustration and description only and are not to be construed as limiting the scope of the invention in any way. The scope of the invention is to be determined from the claims appended hereto.

What is claimed is:

1. A system for crediting loyalty program points to a loyalty program account, comprising:
   a host computer comprising a programmable processor and a storage unit;
   an object comprising an embedded electronic tag, wherein the embedded electronic tag comprises tag identification information, wherein the tag identification information is associated with a loyalty program account file stored in the storage unit of the host computer;
   a tag identification information reader; and
   a point-of-sale device in communication with the tag identification information reader, wherein the tag identification information reader is configured to receive the tag identification information from the embedded electronic tag at the time of making a purchase transaction at the point-of-sale device, wherein the point-of-sale device is configured to form a transaction file unique to the purchase transaction by combining the tag identification information with a purchase transaction amount, date and location of the purchase transaction, wherein the point-of-sale device is further in communication with the host computer,
   wherein the host computer is configured to receive the transaction file,
   wherein the programmable processor is configured to determine the tag identification information contained in the transaction file, determine the loyalty program account file that is associated with the tag identification information, store the purchase transaction amount, date and location of purchase in the associated loyalty program account file, determine whether loyalty points should be credited to the loyalty program account file according to predetermined conditions and aggregate credited loyalty program points in the loyalty program account file;
   wherein the system allows a merchant to: (a) identify, prior to the purchase transaction, a loyalty program customer who has achieved a defined participation level in the loyalty program, and (b) offer a reward to the loyalty program customer prior to the purchase transaction.

2. The system of claim 1, wherein the object comprising the embedded tag is selected according to one or more of the aggregate purchase amounts and number of purchase transactions conducted by the loyalty program customer within a predetermined time period.

3. The system of claim 2, wherein the object comprises one of a charm, a necklace, earrings, a ring, a bracelet, cuff links, a money clip, a watch, a tie clip, a tie tack, a wallet, a pocket knife, a lighter, a pen, a belt, a belt buckle, a dog tag, a medallion, a button, a pin, a lapel pin, a key ring, a dress, a hat, a sweater, shoes, sunglasses, a purse, a scarf, a barrette or a shopping bag.

4. The system of claim 2, wherein the object comprises a symbol, a name, one or more colors or a shape, or combinations thereof, that are associated with the sponsor of the loyalty program.

5. The system of claim 1, wherein the programmable processor of the host computer is configured to determine one or more rewards available to the customer based upon the aggregated total amount of loyalty program points in the loyalty program account file.

6. The system of claim 5, wherein the host computer is configured to debit loyalty program points from the loyalty program account file based upon receipt of one or more rewards by the customer.

7. The system of claim 1, wherein the point-of-sale device comprises the tag identification information reader.

8. The system of claim 1, wherein the point-of-sale device further comprises a display unit.

9. The system of claim 8, wherein the loyalty program account file comprises an image of the customer.

10. A method for maintaining a loyalty program account, comprising:
    distributing an object comprising an embedded electronic tag to a loyalty program customer, wherein the embedded electronic tag comprises tag identification information, wherein the tag identification information is associated with a loyalty program account file associated with the loyalty program of the customer, wherein the loyalty program account file is stored in a storage unit of a host computer, wherein the host computer comprises a programmable processor and the storage unit;
    detecting tag identification information emitted from the embedded electronic tag by a reader unit when the object comprising the embedded tag is presented by the loyalty program customer while conducting a purchase transaction at a point-of-sale device, wherein the reader is in communication with the point-of-sale device;
    identifying, prior to the purchase transaction, a loyalty program customer who has achieved a defined participation level in the loyalty program;
    offering a reward to such loyalty program customer prior to the purchase transaction;
    forming a transaction file unique to the purchase transaction by the point-of-sale device by combining the tag identification information with purchase transaction amount, date and location of the purchase;
    transmitting the transaction file from the point-of-sale device to the host computer;

receiving the transaction file by the host computer;
retrieving the tag identification information from the transaction file by the programmable processor of the host computer;
determining by the programmable processor of the host computer the loyalty program account file that is associated with the tag identification information;
storing in the associated loyalty program account file the purchase transaction amount, date and location;
determining by the programmable processing unit whether loyalty points should be credited to the loyalty program account file according to predetermined criteria; and
storing in the loyalty program account file credited loyalty points.

11. The method of claim 10, further comprising selecting the object in which the tag is embedded according to one or more of the aggregate purchase amounts for purchase transactions or the number of purchase transactions conducted by the loyalty program customer within a predetermined time period.

12. The method of claim 11, wherein the object comprises one of a charm, a necklace, earrings, a ring, a bracelet, cuff links, a money clip, a watch, a tie clip, a tie tack, a wallet, a pocket knife, a lighter, a pen, a belt, a belt buckle, a dog tag, a medallion, a button, a pin, a lapel pin, a key ring, a dress, a hat, a sweater, shoes, sunglasses, a purse, a scarf, a barrette or a shopping bag.

13. The method of claim 11, wherein the object comprises a symbol, a name, one or more colors or a shape, or combinations thereof, that are associated with the sponsor of the loyalty program.

14. The method of claim 10, further comprising determining by the programmable processor one or more rewards available to the customer based upon the aggregated total amount of loyalty program points in the loyalty program account file.

15. The method of claim 14, further comprising transmitting from the host computer to the point-of-sale device information regarding the rewards that are available to the customer.

16. The method of claim 10, further comprising retrieving by the host computer an electronic image of the customer from the loyalty program account file upon receipt of the tag identification information, transmitting the electronic image of the customer to the point-of-sale device, and displaying on a display unit in communication with the point-of-sale device the electronic image of the customer at the time of the transaction.

17. The method of claim 10, further comprising:
associating a funding source with the tag identification information in the loyalty program account file;
retrieving by the programmable processor information regarding the funding source upon retrieval of the tag identification information from the transaction file; and
funding the purchase transaction with the funding source.

18. A method for providing rewards to a loyalty program customer, comprising:
distributing an object comprising an embedded electronic tag to a loyalty program customer, wherein the embedded electronic tag comprises tag identification information, wherein the tag identification information is associated with a loyalty program account file, wherein the loyalty program account file is associated with the loyalty program of the customer in a storage unit of a host computer, wherein the host computer comprises a programmable processor and the storage unit;
detecting by a reader situated in a store location tag identification information emitted from the embedded electronic tag when the customer is present at the store location;
transmitting by the reader the tag identification information to the host computer;
receiving the tag identification information by the host computer;
determining by the programmable processor of the host computer the loyalty program account file that is associated with the tag identification information;
retrieving by the programmable processor an electronic image of the customer from the loyalty program account file upon receipt of the tag identification information;
transmitting the electronic image of the customer to a receiving unit in the store location;
displaying on a display unit in communication with the receiving unit the electronic image of the customer; and
offering a reward to the customer prior to the customer making a purchase.

19. The method of claim 18, further comprising identifying the customer by a person in communication with the receiving unit based on the received electronic image and thereafter offering the customer one or more rewards.

20. The method of claim 19, wherein the pre-determined threshold of participation comprises one or more of the number of purchases the customer has made from a store that sponsors the loyalty program and an aggregate transactions amount.

21. A computer-implemented method comprising:
providing an object comprising an electronic tag to a loyalty program customer who has achieved a predefined participation level in a loyalty program;
receiving electronic tag identification information from a tag identification information reader via a network;
sending to a communication device operated by a merchant employee, via a network, an electronic image of the loyalty program customer corresponding to the received electronic tag identification information; and
sending to the communication device, via the network, information identifying one or more rewards available to the loyalty program customer based on the predefined participation level achieved by the loyalty program customer;
wherein the merchant employee is able to identify the loyalty program customer by the object or by the electronic image and to offer the reward to the loyalty program customer prior to the loyalty program customer executing a purchase transaction.

22. The method of claim 21, wherein the object is selected based on the predefined participation level.

23. A system comprising:
a host computer comprising a programmed processor and a memory, wherein the programmed processor is configured to:
receive a transaction file via a network from a point of sale device that comprises electronic tag identification information, a purchase transaction amount, a date of purchase transaction, and a location of purchase transaction;
identify the electronic tag identification information contained in the transaction file;
identify a loyalty program account file that is associated with the electronic tag identification information;
determine whether loyalty points should be credited to the loyalty program account file according to predetermined conditions;

aggregate credited loyalty points in the loyalty program account file;
transmit an electronic image of the loyalty program customer via a network to a communication device operated by a merchant employee; and
transmit an identification of one or more rewards available to the loyalty program customer via the network to the communication device, enabling the merchant employee to offer the one or more rewards to the loyalty program customer prior to the loyalty program customer executing a purchase transaction.

* * * * *